(12) United States Patent
Obaidi

(10) Patent No.: US 11,954,075 B2
(45) Date of Patent: *Apr. 9, 2024

(54) SYSTEMS AND METHODS FOR REMOTE DEVICE SECURITY ATTESTATION AND MANIPULATION DETECTION

(71) Applicant: T-Mobile USA, Inc., Bellevue, WA (US)

(72) Inventor: Ahmad Arash Obaidi, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,442

(22) Filed: May 9, 2022

(65) Prior Publication Data
US 2022/0261382 A1    Aug. 18, 2022

Related U.S. Application Data

(63) Continuation of application No. 16/411,732, filed on May 14, 2019, now Pat. No. 11,330,441.

(51) Int. Cl.
*G06F 16/182* (2019.01)
*G06F 21/57* (2013.01)
(Continued)

(52) U.S. Cl.
CPC ........ *G06F 16/1834* (2019.01); *G06F 21/575* (2013.01); *H04L 9/0643* (2013.01); *H04W 12/30* (2021.01)

(58) Field of Classification Search
CPC .. H04W 12/30; G06F 16/1834; G06F 21/575; G06F 21/51; G06F 21/57; G06F 21/36; H04L 9/0643; H04L 2209/38; H04L 63/08
See application file for complete search history.

(56) References Cited

U.S. PATENT DOCUMENTS 8,726,376 B2 *   5/2014   Rieschick ........... H04W 12/128
                                                           705/52
10,123,202 B1    11/2018  Polehn et al.
(Continued)

FOREIGN PATENT DOCUMENTS

CN    107667554 A    2/2018
CN    107734502 B    2/2020

OTHER PUBLICATIONS

Chinese Office Action mailed Oct. 17, 2023 for Chinese Application No. 202010288504.3, a foreign counterpart to U.S. Pat. No. 11,330,441, 16 pages.

*Primary Examiner* — Mohammed Waliullah
(74) *Attorney, Agent, or Firm* — Lee & Hayes P.C.

(57) ABSTRACT

A system including: a transceiver; a boot processor configured to: capture an image of a container of the system, determine whether the system container image has been modified, and post, to a node of a distributed ledger network, a first attestation based on a determination of whether an anomaly exists in the system container image; a system processor; and a memory storing instructions that instruct the system processor to: receive a request to connect to an external device, request a second attestation from a node of the distributed ledger network as to whether an anomaly exists in the external device container image, determine whether an anomaly exists in the external device container image, and either: establish, in response to determining that an anomaly does not exist, a connection with the external device, or deny the request to connect to the external device in response to determining that an anomaly exists.

4 Claims, 7 Drawing Sheets

(51) Int. Cl.
   *H04L 9/06*      (2006.01)
   *H04W 12/30*     (2021.01)

(56) References Cited

U.S. PATENT DOCUMENTS

| | | |
|---|---|---|
| 10,397,255 B1* | 8/2019 | Bhalotra ............. H04L 63/1425 |
| 2013/0007868 A1* | 1/2013 | Hoggan .............. H04L 63/0815 |
| | | 726/8 |
| 2013/0125223 A1* | 5/2013 | Sorotokin ............ H04L 9/3213 |
| | | 713/168 |
| 2013/0227668 A1* | 8/2013 | Mocanu ................ G06F 21/41 |
| | | 726/8 |
| 2016/0261461 A1* | 9/2016 | Väänänen ............... H04L 63/12 |
| 2018/0167217 A1 | 6/2018 | Brady et al. |
| 2018/0181759 A1* | 6/2018 | Smith ................... H04L 9/3239 |
| 2019/0080118 A1 | 3/2019 | Brady et al. |
| 2019/0227810 A1* | 7/2019 | Jacquin ................ G06F 21/572 |
| 2020/0310775 A1* | 10/2020 | Nyamars ............. G06Q 20/382 |

* cited by examiner

SYSTEMS AND METHODS FOR REMOTE DEVICE SECURITY ATTESTATION AND MANIPULATION DETECTION

CROSS REFERENCE TO RELATED APPLICATIONS AND PRIORITY CLAIM

This application is a continuation of, and claims priority under 35 U.S.C. § 120 to, U.S. patent application Ser. No. 16/411,732, of the same title, filed May 14, 2019, which is incorporated herein as if fully set forth below.

FIELD

Examples of the present disclosure relate generally to providing and confirming device security and, more particularly, to systems and methods for remote device security attestation and manipulation detection.

BACKGROUND

Trust is a persistent requirement in connecting remote systems. In the related art, centralized certificate authorities (CAs) serve as trusted parties for certifying the identity of systems (e.g., servers) by issuing certificates. However, CAs have significant limitations. For one, certificates can be faked, and unreliable CAs can be established. Additionally, the use of CAs places trust in a single, third-party authority, creating significant security vulnerabilities. Moreover, even if the CA and certificate are valid, certificates only attest to a system's identity, and provide no protection if the system itself is compromised.

These issues can be especially significant where needed systems may not be readily predictable. For instance, user equipment (UE) (e.g., cell phones, smartphones, etc.) must communicate with numerous network access points to connect to cellular, WiFi®, or other network types to maintain telephone and data services. These network access points are continuously added, removed, and updated. Furthermore, network access (e.g., to cellular network) is provided by and among a plurality of network providers. For example, cellular providers each have their own nodes that connect to UEs to cellular networks. To extend cellular coverage over a larger geography, cellular providers utilize each other's network nodes. Since a UE must utilize access points available at a given location whether controlled by a known entity (e.g., a cellular provider to which the UE subscribes) or not (e.g., third-party connection point), the UE must be able to establish trust with both known and unknown/unknowable systems dynamically. Relying on CAs subjects the UE to a significant risk of connecting to a compromised system.

Accordingly, there is a need for improved systems and methods for establishing trust between remote devices. More specifically, a need exists for providing security attestation and manipulation detection across system environments in a way that avoids centralized risks. By providing distributed security attestation, over-reliance on the centralized attestation of a CA may be avoided. Aspects of the present disclosure are related to these and other concerns.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

As discussed above, when one device wants to connect to another, the devices must determine that they can trust each other. In the related art, trust is established through the use of certificates provided by Certificate Authorities (CAs), which attest to the identity of the devices. However, as mentioned, certificates may be faked, certificates are unable to identify compromised (e.g., hacked) systems, and third-party CAs must be relied upon explicitly, concentrating risk.

To this end, it is desirable to have an improved mechanism for determining device security of remote systems prior to connection. In examples of the present disclosure, each device captures an image of its own container stack, analyzes the image to determine whether the device has been compromised, and shares its determination with a node of an attesting distributed ledger (e.g., blockchain). Then, before a first device connects with a second device, the first device requests from the distributed ledger whether the second device has a valid container stack. If the distributed ledger attests that the second device is valid, the first device will connect to the second device. However, if the distributed ledger attests that the second device is invalid, the first device will not connect to the second device. The distributed ledger may be formed as a private or permissioned blockchain subscribed to by a plurality of trusted entities.

In some examples, the image is captured and/or analyzed as part of a secure boot process. The image may be hashed, and a hashed version of the image may be shared with the distributed ledger in addition to the device attestation.

Although aspects of the present disclosure are generally discussed with reference to UEs and service providers, this is merely an example. One of ordinary skill will recognize that aspects of the present disclosure may be applied to various fields and challenges. As a non-limiting example, self-driving cars may perform device imaging and provide attestation information to distributed ledger nodes maintained by their respective car manufacturer. Before trusting information received from an unknown self-driving car, a self-driving car may request attestation information from a ledger node maintained by the car's manufacturer. If the unknown car is considered valid by the ledger node, the self-driving car may exchange information therewith.

Reference will now be made in detail to aspects of the disclosed technology, examples of which are illustrated in the accompanying drawings and disclosed herein. Wherever convenient, the same references numbers will be used throughout the drawings to refer to the same or like parts.

Figure 1:
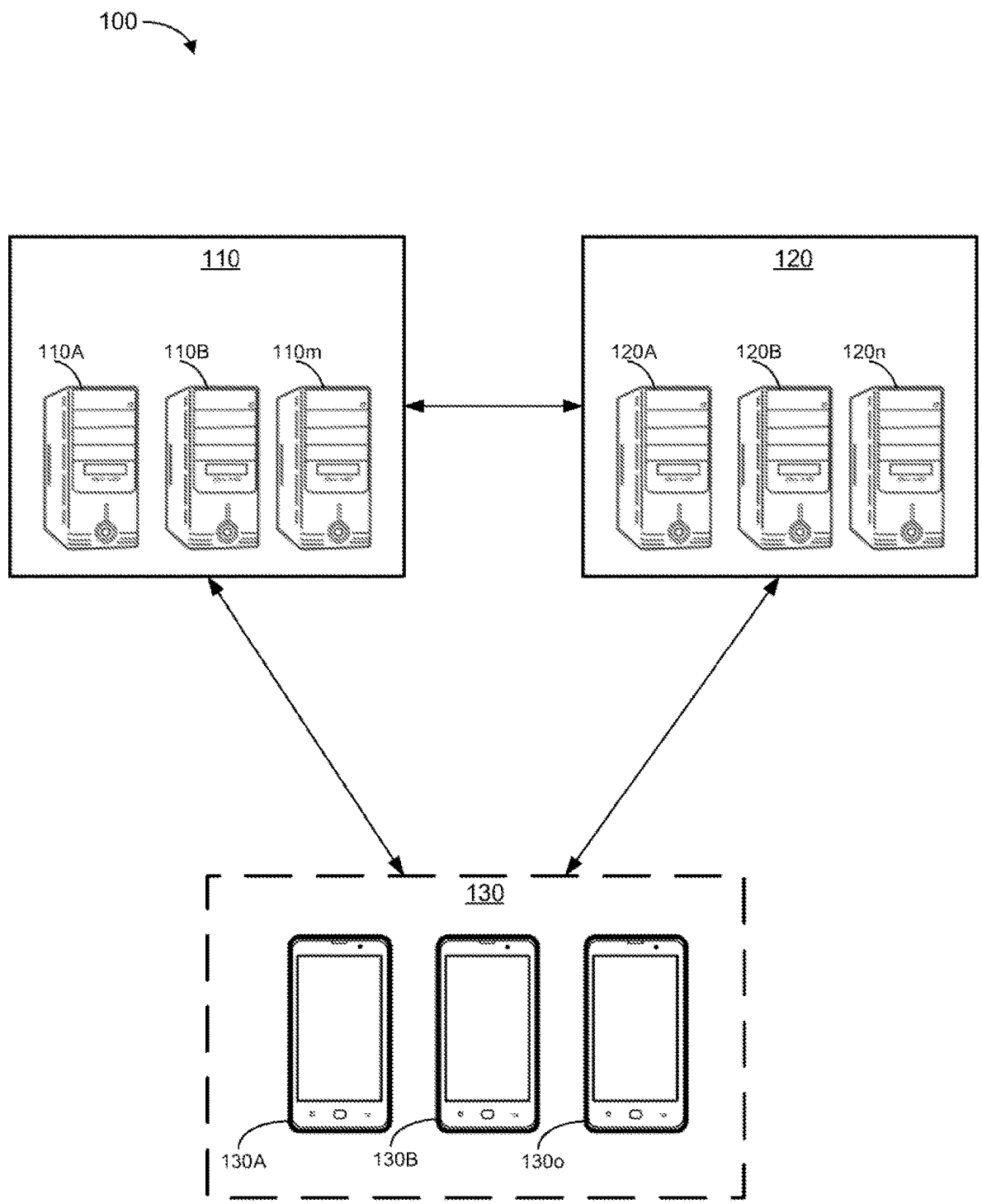
FIG. 1 is a diagram of an example of a system environment for remote device attestation including a user equipment (UE), attestation servers, and an external device in accordance with some examples of the present disclosure.

As shown in FIG. 1, an example of the present disclosure can comprise a system environment 100 for providing remote device attestation in accordance with some examples of the present disclosure. The components and arrangements shown in FIG. 1 are not intended to limit the disclosed embodiments as these components and features may vary. In FIG. 1, the system environment 100 can include one or more distributed ledger nodes 110A-110m, one or more providers 120A-120n, and one or more UEs 130A-130o. In some examples, distributed ledger node 110, provider 120, and UE 130 may communicate with one another. The distributed ledger nodes 110A-110m, the one or more providers 120A-120n, and the one or more UEs 130A-130o may each include one or more processors, memories, boot processors, and/or transceivers. As non-limiting examples, the one or more UEs 130A-130o may be cell phones, smartphones, laptop computers, tablets, or other personal computing devices that include the ability to communicate on one more different types of networks. The distributed ledger nodes 110A-110m and/or the one or more providers 120A-120n may include one or more physical or logical devices (e.g., servers, cloud servers, access points, etc.) or drives. Example computer architectures that may be used to implement the UEs 130A-130o, the distributed ledger nodes 110A-110m, and the providers 120A-120n are described below with reference to FIGS. 5 and 6.

When the UE 130 and/or provider 120 boot, a secure boot process (e.g., executed by a boot processor) may capture an image of the respective device (e.g., an image of the device container stack). This image may be hashed and compared with a hash of a previous device image to determine whether the device (i.e., the UE 130 or the provider 120) has been compromised. The UE 130 and provider 120 transmit the attestation to a node 110 of the distributed ledger. Before the UE 130 and/or provider 120 connects with another device, it will request attestation of the other device from the distributed ledger node 110. If the other device is deemed valid, the UE 130 and/or provider 120 connects to the other device.

The distributed ledger nodes 110A-110m may serve as nodes of a private blockchain that stores attestations of the validity of the UE 130 and the provider 120. The attestations may be received from the UE 130 and the provider 120. When a distributed ledger node 110 receives a request for attestation information of a particular device, it refers to the previously received attestations to determine whether the particular device is valid. Distributed ledger nodes 110A-110m may be maintained by respective known/trusted entities. For example, in some embodiments, a plurality of cellular providers (who also maintain providers 120A-120n) may each maintain one or more of the distributed ledger nodes 110A-110m.

In some examples, the providers 120A-n provide one or more network services to the UE 130 and can communicate with one or more of the distributed ledger nodes 110A-110m. The providers 120A-n may also communicate with the UE 130. For example, the providers 120A-n may serve as access points to different networks (e.g., cellular, WiFi®, 4G, LTE, etc.). The providers 120A-n may attest to their own validity to one or more of the distributed ledger nodes 110A-110m.

Provider 120 may capture an image of software containers running thereon, for example, when the containers are deployed or when the provider 120 boots. Provider 120 may analyze the captured images (or hashes of the images) to determine whether the provider 120 is secure. Providers 120 may attest to one or more of the distributed ledger nodes 110A-110m whether the provider 120 is secure and, in some cases, may also provide a copy of the image or hashed image to the nodes 110A-110m.

When a first provider (e.g., Provider 120A) is to interact with a second provider (e.g., Provider 120B), the first provider will check with the one or more of the distributed ledger nodes 110A-110m to determine whether the second provider has attested to its validity. Likewise, the second provider will check with the one or more of the distributed ledger nodes 110A-110m to determine whether the first provider has attested to its validity. If both the first and second providers have attested to their validity on the distributed ledger, the first and second providers will connect to each other.

The UE 130 may communicate with the at least one distributed ledger node 110 and at least one provider 120. The UE 130 may attest to its own validity to one or more of the distributed ledger nodes 110A-110m. The UE 130 may capture an image of software containers running on the UE 130, for example, when the containers are deployed or during a secure boot process. The UE 130 may analyze the captured images (or hashes of the images) to determine whether the UE 130 is secure. The UE 130 may attest to one or more of the distributed ledger nodes 110A-110m, whether the UE 130 is secure and, in some cases, may also provide a copy of the image or hashed image.

When the UE 130 wants to interact with a provider 120 or another device (e.g., another UE 130), such as in response to a request from a user, the UE 130 will check with the one or more of the distributed ledger nodes 110A-110m to determine whether the provider or other device has attested to its validity. If the one or more of the distributed ledger nodes 110A-110m confirms the provider 120 or other device has attested to its validity, the UE 130 will connect to the provider 120 or other device. If the one or more of the distributed ledger nodes 110A-110m indicates that the provider 120 or other device has not attested to its validity (or its attestation indicates that the other device is invalid), the UE 130 will not connect to the provider 120 or other device. In some cases, the UE 130 may output a notice (e.g., to a user of the UE 130 via a graphical user interface) that the provider 120 or other device is potentially compromised. The user may be able to instruct or command the UE 130 (e.g., through the graphical user interface) to connect to the provider 120 or other device despite the attestation of invalidity.

In some examples, the distributed ledger nodes 110A-110m, providers 120A-120n, and UEs 130A-130o may be associated with respective entities. For example, each provider 120 may be a physical device (e.g., server, access point, or network node) controlled by a cellular provider of a plurality of cellular providers. Similarly, each distributed ledger node 110 may be maintained or associated with a cellular provider among the plurality of cellular providers, e.g., for cellular or data service. Each UE 130 may subscribe to a cellular provider among the plurality of cellular providers. The providers 120A-120n may communicate with distributed ledger nodes 110A-110m associated with a same cellular provider. The UEs 130A-130o may likewise communicate with distributed ledger nodes 110A-110m associated with a same cellular provider. In this way, trust may be established between the distributed ledger nodes 110A-110m and the providers 120A-n and UEs 130A-o through the cellular provider (e.g., respective entities).

Figure 2:
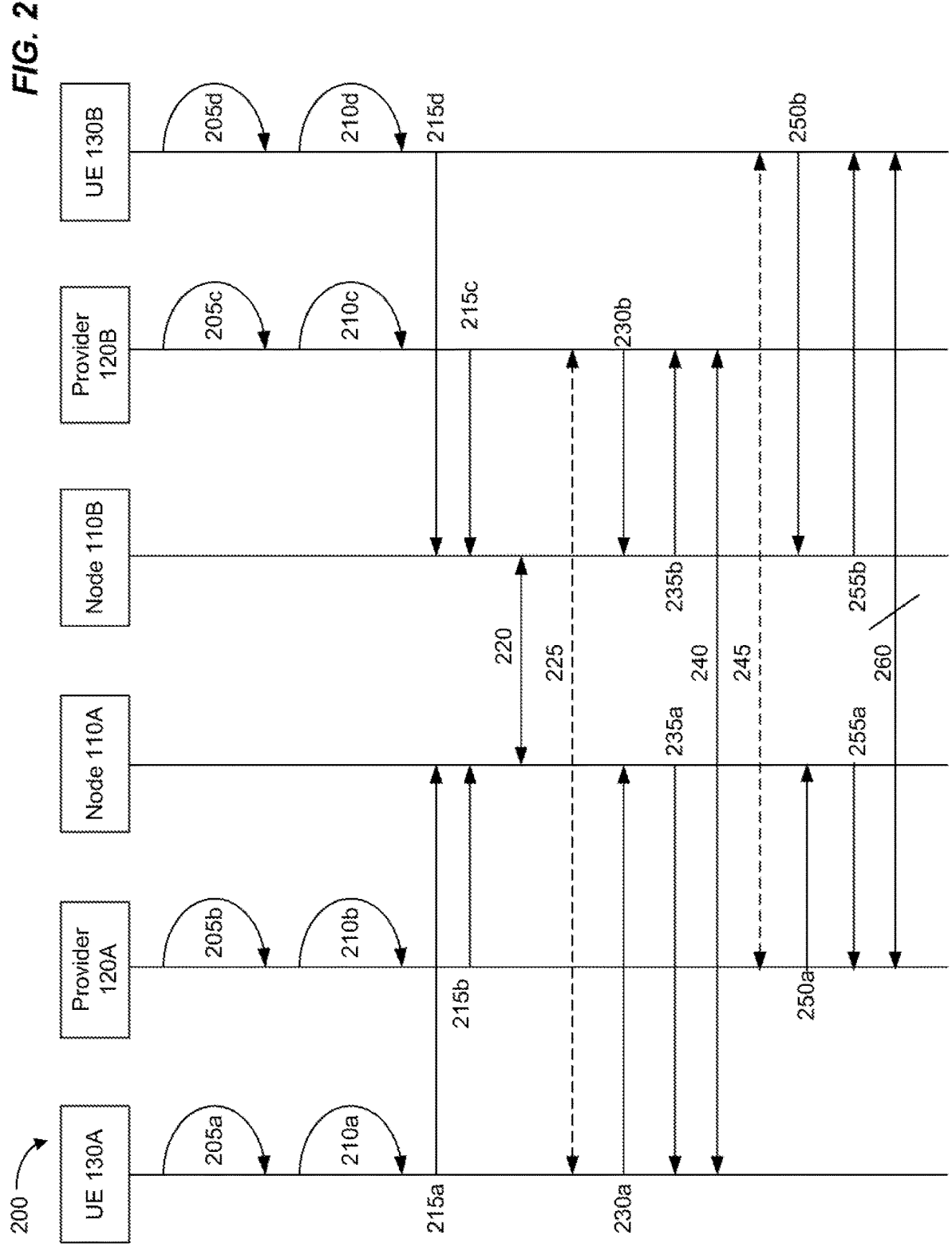
FIG. 2 is a timing diagram depicting an example method of providing remote device attestation, in accordance with some examples of the present disclosure.

FIG. 2 illustrates a timing diagram for an example of a method 200 for providing remote device attestation in accordance with aspects of the present disclosure. The timing diagram illustrates two UEs 130A and 130B, two providers 120A and 120B, and two distributed ledger nodes 110A and 110B. As a non-limiting example, UE 130A, provider 120A, and distributed ledger node 110A may all be associated with a same first cellular provider. Similarly, UE 130B, provider 120B, and distributed ledger node 110B may all be associated with a same second cellular provider.

Referring to FIG. 2, at 205a-d, each of UEs 130A and 130B and providers 120A and 120B capture an image of a software stack implemented on the respective device. At 210a-d, UEs 130A and 130B and providers 120A and 120B analyze the captured images to determine whether they are valid. For example, the devices may compare the captured images (or compare a hash of the captured images) to previous images (or hashed images) of the software stack. Any unanticipated differences identified by the respective device may indicate that the device is invalid. As an example, UEs 130A and 130B and provider 120B may be determined to be valid, while provider 120A may be determined to be invalid.

At 215a-215d, UEs 130A and 130B and providers 120A and 120B may attest to their own validity status to nodes 110A and 110B. UE 130A and provider 120A may attest to their statuses to distributed ledger node 110A, and UE 130B and provider 120B may attest to their statuses to distributed ledger node 110B. In some cases, the attestation may include submitting a copy of the image (or hash of the image) to the nodes 110A and 110B. Although 205a-205d, 210a-210d, and 215a-215d are depicted as being performed at substantially simultaneously, this is merely an example. Each device may perform image capture, analysis, and attestation independently, for example, upon booting of each device or loading of a software program into a container on the device.

At 220, distributed ledger nodes 110A and 110B exchange the attestation information received from the respective devices. For example, distributed ledger node 110A may post attestation information for UE 130A and provider 120A to the ledger (e.g., as transactions to the ledger hosted by both nodes 110A and 110B). Similarly, distributed ledger node 110B may post attestation information for UE 130B and provider 120B to the ledger. Thus, both nodes 110A and 110B may access the attestation information for each of UE 130A and 130B and providers 120A and 120B.

At 225, the UE 130A and provider 120B, may desire to connect (e.g., if UE 130A moves into a geographic region where the second cellular network provides cellular service). Prior to connecting, at 230a UE 130A requests attestation information for provider 120B from node 110A, and at 230b provider 120b requests attestation information for UE 130A from node 110B. At 235a node 110A provides to UE 130A the attestation information that provider 120B is valid. Likewise, at 235b node 110B provides to provider 120B the attestation information that UE 130A is valid. Accordingly, at 240 UE 130A and provider 120B are connected.

At 245, the UE 130B and provider 120A may desire to connect (e.g., if UE 130B moves into a geographic region where the first cellular network provides cellular service). Prior to connecting, at 250a provider 120A requests attestation information for UE 130B from node 110A, and at 250b UE 130B requests attestation information for provider 120A from node 110B. At 255a node 110A provides to provider 120A the attestation information that UE 130B is valid. However, at 255b node 110B provides to UE 130B the attestation information that provider 120A is invalid. Since provider 120A is considered invalid, at 260 UE 130B may cancel the connection request with provider 120A.

Although FIG. 2 illustrates all UEs 130A and 130B and providers 120A and 120B self-attesting to nodes 110A and 110B, and confirming the attestation of their connection partners from nodes 110A and 110B, this is merely an example. In some cases, only providers 120A and 120B may self-attest to nodes 110A and 110B, and/or only UEs 130A and 130B may confirm the attestation of their connection partners.

Figure 3:
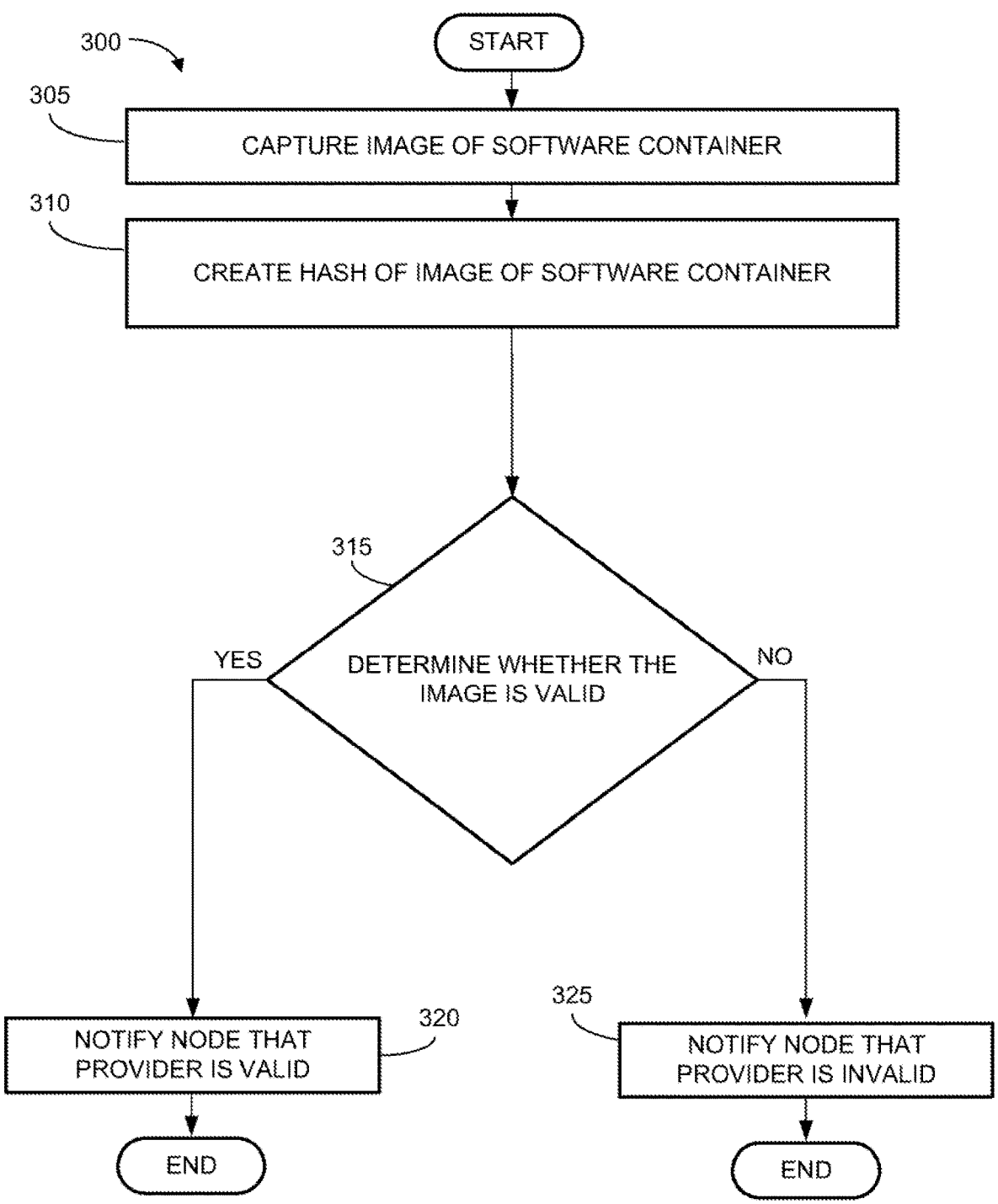
FIG. 3 is a flowchart depicting self-attesting to a distributed ledger, in accordance with some examples of the present disclosure.

FIG. 3 illustrates a flowchart for an example of a method 300 for self-attesting to a distributed ledger. The flowchart illustrates the method 300 from the perspective of the provider 120 (e.g., providers 120A-120n). The provider 120 may communicate with the UE 130 (e.g., UE 130A-1300) to provide services (e.g., cellular or data services) thereto. Further, the provider 120 may communicate with one or more distributed ledger nodes 110 (e.g., nodes 110A-110m) to attest to its own validity.

At 305, the provider 120 (e.g., a boot processor of the provider 120) captures an image of its software container. The capturing may be performed automatically upon booting of the provider 120 (e.g., using a secure boot processor) and/or when a software stack is deployed on a container of the provider 120. For example, provider 120 may image the entire software container based on a root of trust tied to the hardware (e.g., boot processor).

At 310, the provider 120 (e.g., the boot processor) creates a hash of the captured image of the software container. The hashing of the image may, for example, include generating secure hash (e.g., SHA, SHA-2, SHA-3, Blake, or Whirlpool hash) of the container image.

At 315, the provider 120 (e.g., the boot processor) determines whether the image is valid. For example, the provider 120 compares the hash of the software container image with a hash of a previous image of the container. The comparing may identify any differences between the hash of the image and the hash of the previous image. In some cases, the determining may compensate for anticipated changes to the image (e.g., if a verified system update has been pushed, the comparison may ignore related changes), and only determine invalidity upon identifying an unanticipated difference.

If the image is determined to be valid, then, at 320, the provider 120 (e.g., through a transceiver) notifies or attests to distributed ledger node 110 (e.g., distributed ledger nodes 110A-110m) that it is valid. On the other hand, if the image is determined to be invalid, then, at 325, the provider 120 (e.g., through the transceiver) notifies or attests to the distributed ledger node 110 that it is invalid. In some cases, provider 120 may transmit a copy of the hash of the container image with the notification. The provider 120 may also sign the hash, and incorporate, for example, time-codes or date stamps into the hash before sharing the image hash with the node 110. Node 110 may post the attestation and/or image hash onto the ledger in association with provider 120 (e.g., associated with a related IP address, MAC address, or similar of the provider 120). Node 110 may a distributed ledger node 110 from a plurality of distributed ledger nodes 110A-110m that is related to a same entity (e.g., cellular service provider) as provider 120.

Although the method 300 has been discussed with reference to a provider 120, this is merely an example. One of ordinary skill will recognize in light of the present disclosure that aspects of the present disclosure may be implemented by the UE 130 and/or other systems or devices, and such devices may similarly self-attest to a distributed ledger.

Figure 4:
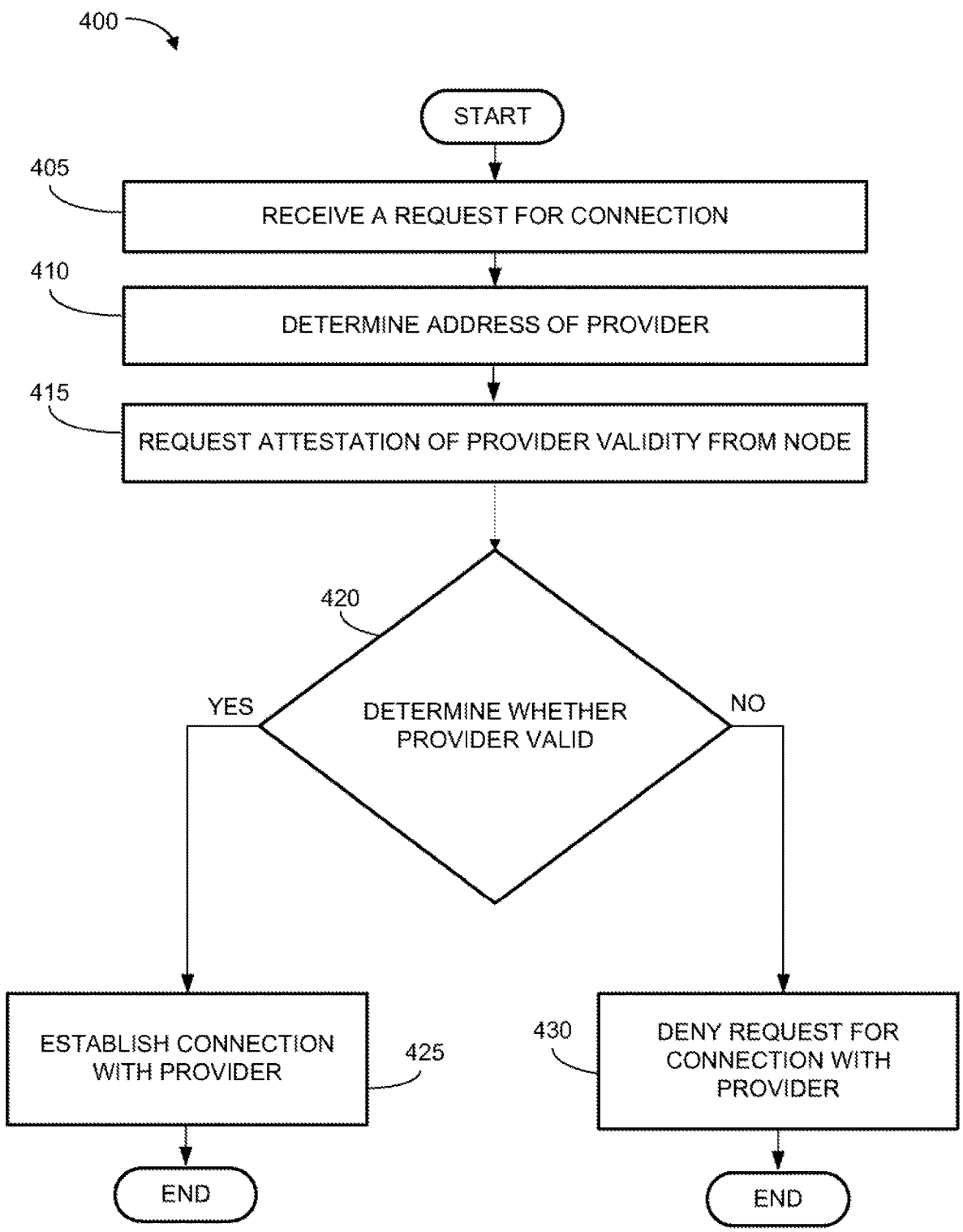
FIG. 4 is a flowchart depicting an example of a method for validating remote systems, in accordance with some examples of the present disclosure.

FIG. 4 is a flowchart of an example of a method 400 for validating remote systems. The flowchart is from the perspective of a UE 130 (e.g., UE 130A-130o) in communication with a distributed ledger node 110 (e.g., one or more of nodes 110A-110m) and one or more providers 120 (e.g., provider 120A-120n). The UE 130 may receive an indication to connect with provider 120, and, prior to connection, determine the validity of the provider 120 based on attestations from node 110.

At 405, the UE 130 receives a request for connection to provider 120. The request may be received from a user directly (e.g., via an instruction to connect to provider 120) or indirectly. For example, the request may be part of a service handoff between cellular base stations, or a redirect upon a navigation request.

At 410, the UE 130 determines an address of provider 120. Determining the address may be implicit in the request (e.g., if it is a handoff). In some cases, determining the address may involve requesting the address (e.g., IP address) of the provider 120 from a name server, and receiving the address in response.

At 415, the UE 130 requests an attestation of the provider 120 from distributed ledger node 110. Node 110 may be a node from a plurality of distributed ledger nodes 110A-110m that are related to a same entity (e.g., cellular service provider) as UE 130. The request for attestation may include the address of the provider 120. Node 110 may then look up the provider's 120 attestation based on its address, and provide the attestation to the UE 130.

At 420, the UE 130 determines whether the provider is valid. That is, UE 130 determines whether the attestation from node 110 indicates that provider 120 is compromised.

If provider 120 is determined to be valid, then, at 425, the UE 130 establishes a connection with provider 120. UE 130 and provider 120 may then exchange data. However, if the provider 120 is determined to be invalid, then, at 430, the UE 130 denies the request for connection with provider 120. In some cases, UE 130 may output a notice that provider 120 is compromised. A user of the UE 130 may, in some implementations, override the decision and instruct UE 130 to connect to provider 120.

FIG. 4 is described in terms of the UE 130 connecting with a provider 120. However, this is merely an example. In light of the present disclosure, one of ordinary skill will recognize that various other systems (e.g., UEs 130A-130o and/or providers 120A-120n) can perform a similar method when connecting to a device as described above, so long as a connecting device has attested to their validity to a distributed ledger.

Figure 5:
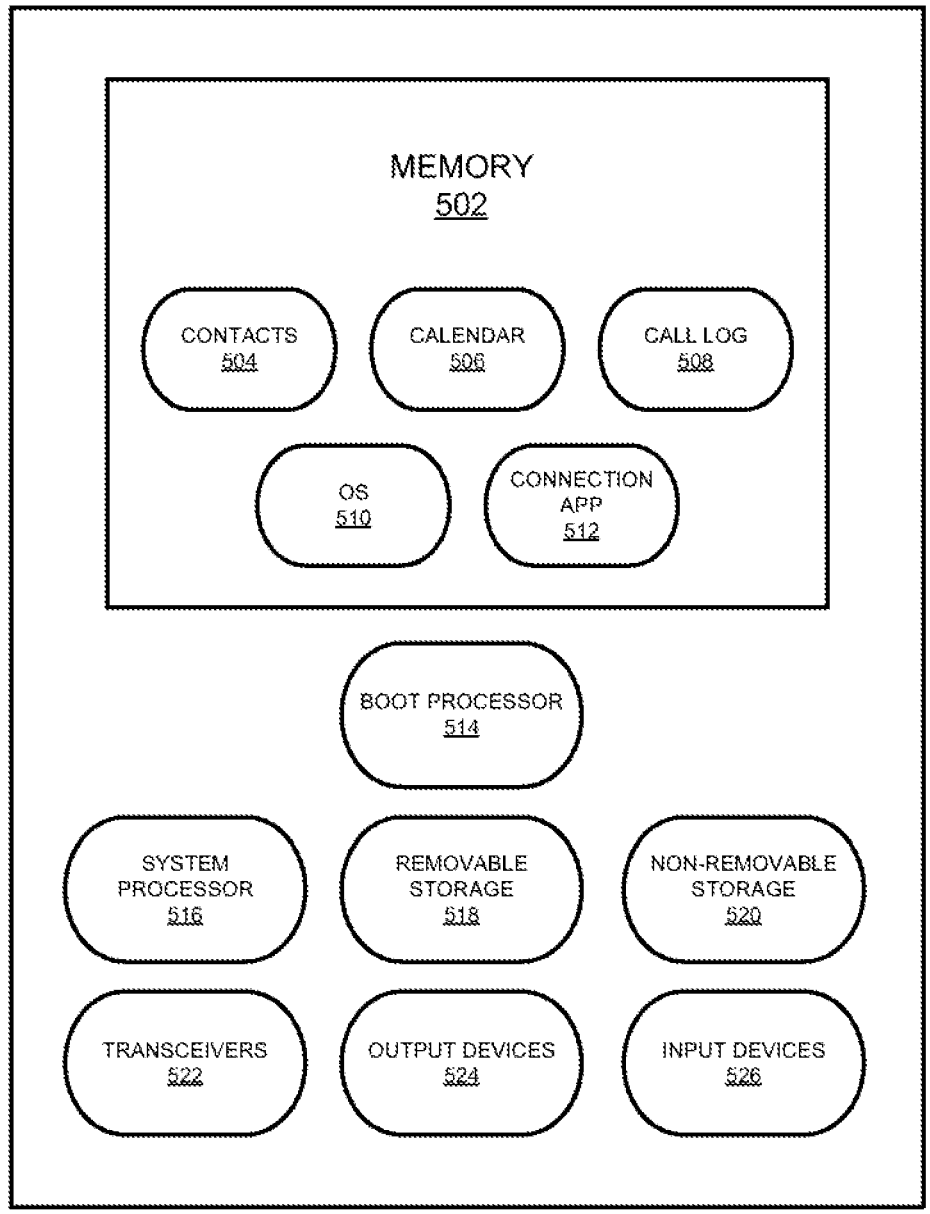
FIG. 5 is an example of a UE for use with the systems and methods disclosed herein, in accordance with some examples of the present disclosure.

As shown in FIG. 5, some, or all, of the system environment 100 and methods 200, 300, 400 may be performed by, and/or in conjunction with, the UE 130. For clarity, the UE 130 is described herein generally as a cell phone or smartphone. One of skill in the art will recognize, however, that the system environment 100 and methods 200, 300, 400 may also be used with a variety of other electronic devices, such as, for example, tablet computers, laptops, desktops, and other network (e.g., cellular or IP network) connected devices from which a call may be placed, a text may be sent, and/or data may be received. These devices are referred to collectively herein as the UE 130. The UE 130 may comprise a number of components to execute the above-mentioned functions and apps. As discussed below, the UE 130 may comprise memory 502 including many common features such as, for example, contacts 504, a calendar 506, a call log (or, call history) 508, operating system (OS) 510, and one or more applications, such as connection app 512.

The UE 130 may also comprise one or more boot processors 514 and one or more system processors 516. In some implementations, the system processor(s) 516 can include a central processing unit (CPU), a graphics processing unit (GPU), or both CPU and GPU, or any other sort of processing unit. The UE 130 may also include one or more of removable storage 518, non-removable storage 520, one or more transceiver(s) 522, output device(s) 524, and input device(s) 526.

Boot processor 514 may be configured to perform a secure boot. For example, boot processor 514 may control a capturing of an image of the UE 130 (e.g., a software container of the UE 130), hashing of the image, and/or determining, based on the hashed image, whether the UE 130 is compromised. Boot processor 514 may control transceiver 522 to output a determination of whether the UE 130 is compromised and/or the hashed image to a node 110.

System processor 516 may be configured to receive a request to connect to an external device (e.g., another UE 130 or a provider 120). The request may be received through input device 526 and/or through automatic routing. System processor 516 may request (e.g., from node 110) attestation of the external device. For example, the attestation may be a self-attestation stored on a ledger of the distributed ledger node 110. Based on the attestation, the system processor 516 may either establish a connection with the external device (if the external device is determined to be valid), or deny the request to connect to the external device (if the external device is determined to be compromised).

In various implementations, the memory 502 may be volatile (such as random-access memory (RAM)), non-volatile (such as read-only memory (ROM), flash memory, etc.), or some combination of the two. The memory 502 may include all, or part, of the functions 504, 506, 508, 512, and the OS 510 for the UE 130, among other things.

The memory 502 may also comprise contacts 504, which can include names, numbers, addresses, and other information about the user's business and personal acquaintances, among other things. In some examples, the memory 502 may also include a calendar 506, or other software, to enable the user to track appointments and calls, schedule meetings, and provide similar functions. In some examples, the memory 502 may also comprise the call log 508 of calls received, missed, and placed from the UE 130. As usual, the call log 508 may include timestamps for each call for use by the system environment 100. Of course, the memory 502 can also include other software such as, for example, e-mail, text messaging, social media, and utilities (e.g., calculators, clocks, compasses, etc.).

The memory 502 may also include the OS 510. Of course, the OS 510 varies depending on the manufacturer of the UE 130 and currently comprises, for example, iOS 12.1.4 for Apple products and Pie for Android products. The OS 510 contains the modules and software that supports a computer's basic functions, such as scheduling tasks, executing applications, and controlling peripherals.

As mentioned above, the UE 130 may also include the connection app 512. The connection app 512 may perform some, or all, of the functions discussed above with respect to the methods 200, 300, and 400, for interactions occurring between the UE 130 and an external device (e.g., another UE 130, provider 120, and/or distributed ledger nodes 110).

The UE 130 may also include additional data storage devices (removable and/or non-removable) such as, for example, magnetic disks, optical disks, or tape. Such additional storage is illustrated in FIG. 5 by removable storage 518 and non-removable storage 520. The removable storage 518 and non-removable storage 520 can store some, or all, of the functions 504, 506, 508, 512, and the OS 510.

Non-transitory computer-readable media may include volatile and nonvolatile, removable and non-removable tangible, physical media implemented in technology for storage of information, such as computer readable instructions, data structures, program modules, or other data. The memory 502, removable storage 518, and non-removable storage 520 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UE 130. Any such non-transitory computer-readable media may be part of the UE 130 or may be a separate database, databank, remote server, or cloud-based server.

In some implementations, the transceiver(s) 522 may include any sort of transceivers known in the art. In some examples, the transceiver(s) 522 can include a wireless modem to facilitate wireless connectivity with the other UEs, the Internet, and/or an intranet via a cellular connection. Further, the transceiver(s) 522 may include a radio transceiver that performs the function of transmitting and receiving radio frequency communications via an antenna (e.g., Wi-Fi or Bluetooth®). In other examples, the transceiver(s) 522 may include wired communication components, such as a wired modem or Ethernet port, for communicating with the other UE or the provider's Internet-based network. In this case, the transceiver(s) 522 can also enable the UE 130 to communicate with the nodes 110 and the providers 120, as described herein.

In some implementations, output device(s) 524 includes any sort of output devices known in the art, such as a display (e.g., a liquid crystal or thin-film transistor (TFT) display), a touchscreen display, speakers, a vibrating mechanism, or a tactile feedback mechanism. In some examples, output device(s) 524 can play various sounds based on, for example, whether the UE 130 is connected to a network, the type of call being received (e.g., video calls vs. voice calls), the number of active calls, etc. In some examples, output device(s) 524 can play a sound or display a graphic when a new connection (e.g., with provider 120) is requested, a provider 120 is determined to be compromised, a connection is successful, etc. Output device(s) 524 also include ports for one or more peripheral devices, such as headphones, peripheral speakers, or a peripheral display.

In various implementations, input device(s) 526 includes any sort of input devices known in the art. The input device(s) 526 may include, for example, a camera, a microphone, a keyboard/keypad, or a touch-sensitive display. A keyboard/keypad may be a standard push-button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 6:
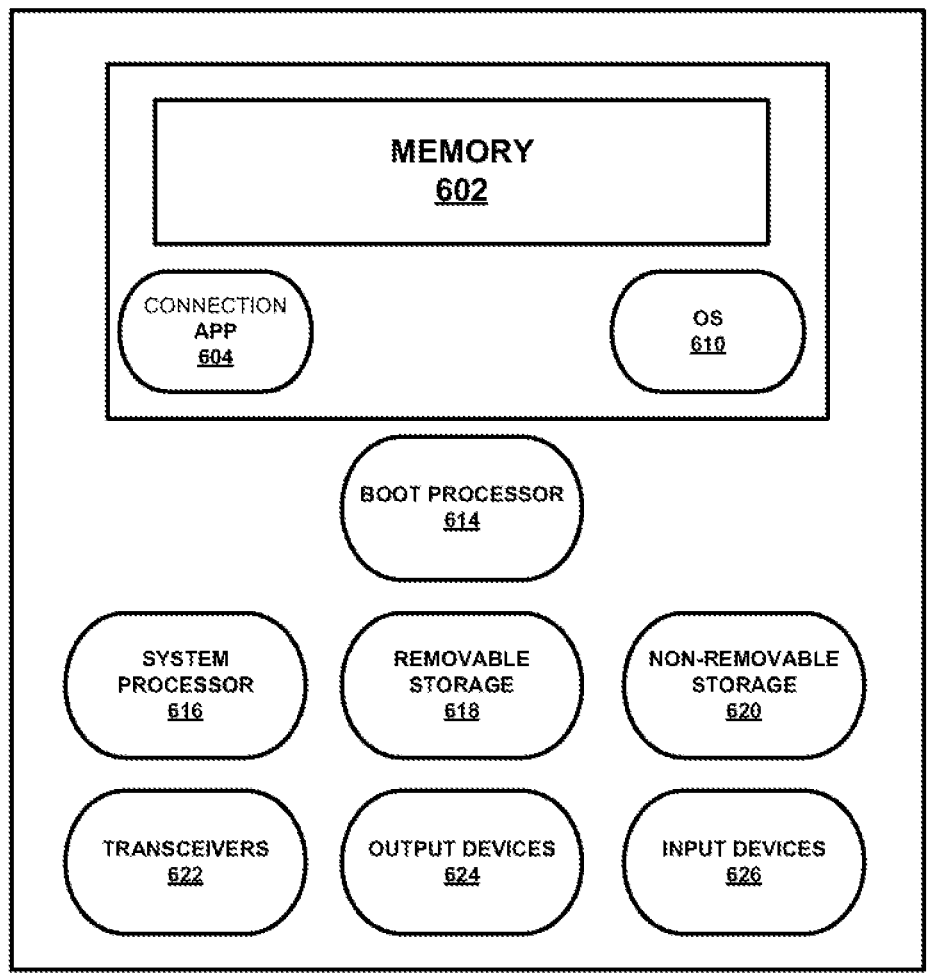
FIG. 6 is an example of a server for use with the systems and methods disclosed herein, in accordance with some examples of the present disclosure.

As shown in FIG. 6, the system environment 100 and methods 200, 300, 400 may also be used in conjunction with a server 600 (e.g., provider 120 and/or distributed ledger node 110). The server 600 can comprise, for example, a desktop or laptop computer, a server, bank of servers, or cloud-based server bank. Thus, while the server 600 is depicted as single standalone servers, other configurations or existing components could be used. In some examples, the server 600 may comprise existing network entities such as, for example, a home location register (HLR), home subscriber service (HSS), a third-generation partnership project authentication, authorization and accounting (3GPP AAA) server, or another server or component. The server 600 may implement aspects of provider 120 and/or node 110.

The server 600 may comprise a number of components to execute the above-mentioned functions and apps. As discussed below, the server 600 may comprise memory 602 including many common features such as, for example, the OS 610.

In various implementations, the memory 602 may be volatile (such as random access memory (RAM)), non-volatile (such as read only memory (ROM), flash memory, etc.), or some combination of the two. The memory 602 may include all, or part, of the functions of a connection app 604, among other things.

The memory 602 may also include the OS 610. Of course, the OS 610 varies depending on the manufacturer of the server 600 and the type of component. Many servers, for example, run Linux or Windows Server. Dedicated cellular routing servers may run specific telecommunications OS 610. The OS 610 contains the modules and software that supports a computer's basic functions, such as scheduling tasks, executing applications, and controlling peripherals.

As shown in FIG. 6, the server 600 can include a boot processor 614. To this end, the server 600 may self-attest to its validity to node 110, for example, substantially similar to that described above with reference to FIGS. 2, 3, and 5. A connection app 604 may provide communication between the server 600 and external systems (e.g., the UE 130, other providers 120, and/or nodes 110).

The server 600 may also comprise one or more system processors 616. In some implementations, the system processor(s) 616 can include a central processing unit (CPU), a graphics processing unit (GPU), or both CPU and GPU, or any other sort of processing unit. The server 600 may also include one or more of removable storage 618, non-removable storage 620, one or more transceiver(s) 622, output device(s) 624, and input device(s) 626.

System processor 616 may be configured to receive a request to connect to an external device (e.g., the UE 130 or another server 600). System processor 616 may request (e.g., from node 110) attestation of the external device. For example, attestation may be a self-attestation stored on a ledger of the distributed ledger node 110. Based on the attestation, the system processor 616 may either establish a connection with the external device (if the external device is determined to be valid), or deny the request to connect to the external device (if the external device is determined to be compromised).

The server 600 may also include additional data storage devices (removable and/or non-removable) such as, for example, magnetic disks, optical disks, or tape. Such additional storage is illustrated in FIG. 6 by removable storage 618 and non-removable storage 620. The removable storage 618 and non-removable storage 620 may store some, or all, of the OS 610 and connection app 604.

Non-transitory computer-readable media may include volatile and nonvolatile, removable and non-removable tangible, physical media implemented in technology for storage of information, such as computer readable instructions, data structures, program modules, or other data. The memory 602, removable storage 618, and non-removable storage 620 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which may be used to store the desired information and which can be accessed by the server 600. Any such non-transitory computer-readable media may be part of the server 600 or may be a separate database, databank, remote server, or cloud-based server.

In some implementations, the transceiver(s) 622 include any sort of transceivers known in the art. In some examples, the transceiver(s) 622 may include a wireless modem to facilitate wireless connectivity with the UEs 130, additional servers, the Internet, and/or an intranet via a cellular connection. Further, the transceiver(s) 622 may include a radio transceiver that performs the function of transmitting and receiving radio frequency communications via an antenna (e.g., Wi-Fi or Bluetooth®). In other examples, the transceiver(s) 622 may include wired communication components, such as a wired modem or Ethernet port, for communicating with the other UEs or the provider's Internet-based network. The transceiver(s) 622 may transmit requests to and receive attestation information from a distributed ledger node 110, and send messages to the UEs 130, among other things.

In some implementations, the output device(s) 624 may include any sort of output devices known in the art, such as a display (e.g., a liquid crystal or thin-film transistor (TFT) display), a touchscreen display, speakers, a vibrating mechanism, or a tactile feedback mechanism. In some examples, the output devices may play various sounds based on, for example, whether the server 600 is connected to a network, the type of data being received (e.g., a match vs. a request for service listings), when SIM-OTA messages are being transmitted, etc. Output device(s) 624 may also include ports for one or more peripheral devices, such as headphones, peripheral speakers, or a peripheral display.

In various implementations, input device(s) 626 includes any sort of input devices known in the art. For example, the input device(s) 626 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 7:
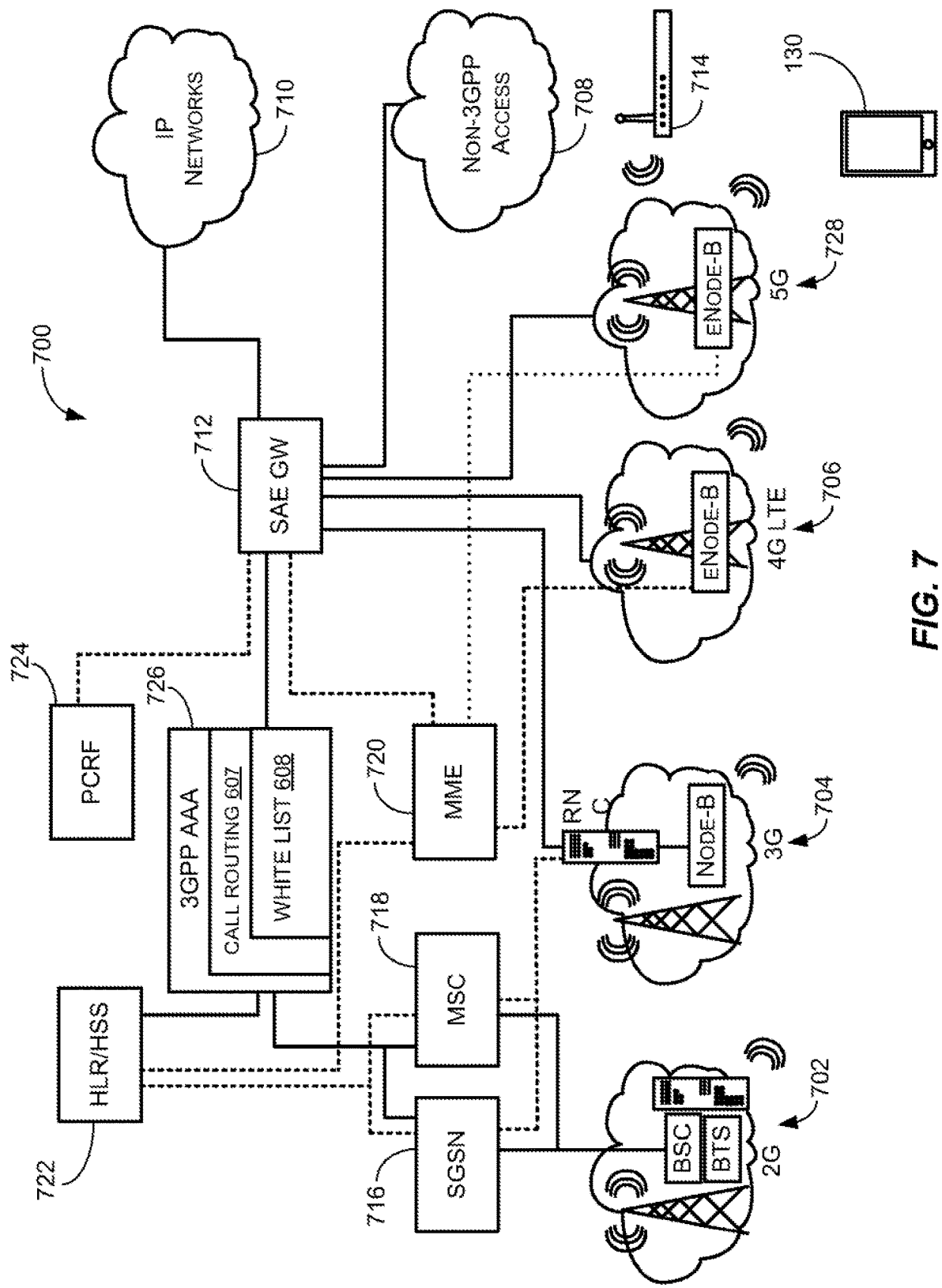
FIG. 7 is an example cellular and internet protocol network for use with some examples of the present disclosure.

FIG. 7 depicts a conventional cellular network 700 including 2G 702, 3G 704, 4G long-term evolution (LTE) 706, and 5G 728 components. Of course, future technologies, such as, for example, 7G and device-to-device (D2D) components could also be included and are contemplated herein. Many of the "back-end" components of network 700 could handle some, or all, of system environment 100 and methods 200, 300, 400 associated with remote device security attestation and manipulation detection.

As is known in the art, data may be routed from the Internet or other sources using a circuit switched modem connection (or non-3GPP connection) 708, which provides relatively low data rates, or via IP based packet switched 710 connections, which results is higher bandwidth. LTE system 706, which is purely IP based, essentially "flattens" the architecture, with data going straight from the internet to service architecture evolution gateway (SAE GW) 712 to evolved Node B transceivers 706, enabling higher through-put. UE 130 also has wireless local area network (WLAN) 714 capabilities, in some cases enabling even higher throughput. In some cases, cellular carriers may use WLAN communications in addition to, or instead of, cellular communications to supplement bandwidth.

Serving GPRS support node (SGSN) 716 is a main component of the general packet radio service (GPRS) network, which handles all packet switched data within the network 700 (e.g., the mobility management and authentication of the users). MSC 718 essentially performs the same functions as SGSN 716 for voice traffic. MSC 718 is the primary service delivery node for global system for mobile communication (GSM) and code division multiple access (CDMA), responsible for routing voice calls and short messaging service (SMS) messages, as well as other services (such as conference calls, fax, and circuit switched data). MSC 718 sets up and releases the end-to-end connection, handles mobility and hand-over requirements during the call, and takes care of charging and real time pre-paid account monitoring.

Similarly, mobility management entity (MME) 720 is the key control-node for 4G LTE network 706 and 5G 728. It is responsible for idle mode UE 130 paging and tagging procedures including retransmissions. MME 720 is involved in the bearer activation/deactivation process and is also responsible for choosing SAE GW 712 for UE 130 at the initial attach and at time of intra-LTE handover involving Core Network (CN) node relocation (i.e., switching from one cell tower to the next when traveling). MME 720 is responsible for authenticating the user (by interacting with the HSS 722 discussed below). The Non-Access Stratum (NAS) signaling terminates at the MME 720 and it is also responsible for generation and allocation of temporary identities to UE 130. The MME 720 also checks the authorization of UE 130 to camp on the service provider's HPLMN or VPLMN and enforces UE 130 roaming restrictions on the VPLMN. MME 720 is the termination point in the network for ciphering/integrity protection for NAS signaling and handles the security key management. MME 720 also provides the control plane function for mobility between LTE 706 and 2G 702/3G 704 access networks with an S3 interface terminating at MME 720 from SGSN 716. MME 720 also terminates an S7a interface towards home HSS 722 for roaming UE 130.

Referring to 5G 728, MME 720 may be configured to respond to an initial attach request by sending a create session request to a network slice selector, also referred to herein as a slice selector and/or a network selector. The create session request may be sent over a logical communication interface that is referred to as an NG4 interface. The NG4 interface typically is used for messaging between the control plane function and the user plane forwarding function of a 5G network. Aspects of the present disclosure may be implemented within containerization of Software Defined Networks (SDN) of 5G nodes, and/or Network Function Virtualization (NfV). As will be understood by one of ordinary skill, SDN decouples traditionally decentralized network control from the physical devices, enabling programmatic control and infrastructure abstraction. Applications, network services, and/or network functions (e.g., NfV) may be implemented within containers via the SDN. The underlying systems (e.g., 5G 728) may capture images of the containers instantiated thereon, attest to the container images to a distributed ledger, and/or verify an anomaly status of other containers/systems prior to connection, for example, in accordance with aspects of the present disclosure.

In response to receiving a create session request, the network slice selector may determine which of the available network slices should be used to provide services for UE 130 and may redirect the create session request to the selected network slice. For example, the create session request may be directed to a gateway component of the selected network slice. Specific for a 5G network, the gateway component may comprise a user plane forwarding function.

HSS/HLR 722 is a central database that contains user-related and subscription-related information. The functions of HSS/HLR 722 include functionalities such as mobility management, call and session establishment support, user authentication and access authorization. HSS, which is used for LTE connections, is based on the previous HLR and Authentication Center (AuC) from CGMA and GSM technologies, with each serving substantially the same functions for their respective networks.

The policy and charging rules function (PCRF) 724 is a software node that determines policy rules in network 700. PCRF 724 generally operates at the network core and accesses subscriber databases (e.g., HSS/HLR 722) and other specialized functions, such as enhanced e911 call handling, in a centralized manner. PCRF 724 is the main part of network 700 that aggregates information to and from network 700 and other sources (e.g., IP networks 710). PCRF 724 may support the creation of rules and then may automatically make policy decisions for each subscriber active on network 700. PCRF 724 may also be integrated with different platforms like billing, rating, charging, and subscriber database or may also be deployed as a standalone entity.

Finally, 3GPP AAA server 726 performs authentication, authorization, and accounting (AAA) functions and may also act as an AAA proxy server. For WLAN 714 access to (3GPP) IP networks 710 3GPP AAA Server 726 provides authorization, policy enforcement, and routing information to various WLAN components. 3GPP AAA Server 726 may generate and report charging/accounting information, performs offline charging control for WLAN 714, and perform various protocol conversions when necessary.

While several possible examples are disclosed above, examples of the present disclosure are not so limited. While the system environment 100 and methods 200, 300, 400 above are discussed with reference to use with cellular communications, for instance, the system environment 100 and methods 200, 300, 400 can be used for other types of wired and wireless communications. In addition, while various functions are discussed as being performed on the UE 130, by the provider 120, or nodes 110, other components could perform the same or similar functions without departing from the spirit of the present disclosure.

The specific configurations, machines, and the size and shape of various elements can be varied according to particular design specifications or constraints requiring a UE 130, server 600, system environment 100, network 700, or method 200, 300, 400 constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A user equipment (UE) comprising:
   a display;
   a transceiver;
   at least one system processor; and
   at least one memory having stored thereon instructions that, when executed by the at least one system processor, instruct the at least one system processor to:
   receive, while connected to a first network, a request to connect to an external device, the external device being an access point to a second network,
   request, via the transceiver and from a first node of a distributed ledger network, an attestation as to whether an anomaly exists in an external device container image associated with the external device,
   assess whether the attestation indicates that an anomaly exists in the external device container image; and
   responsive to determining that an anomaly does not exist in the external device container image, (i) establish a connection with the external device and (ii) join the second network;
   responsive to determining that the external device may be compromised, output, on the display, a graphical user interface including a user input for receiving a user command to connect to the external device; and
   responsive to determining that an anomaly exists in the external device container image, deny the request to connect to the external device.

2. The UE of claim 1, wherein the UE is associated with a first service provider and the external device comprises a network node of a second service provider.

3. The UE of claim 2, wherein the first and second service providers subscribe to the distributed ledger network, and the first node of the distributed ledger network is associated with the first service provider.

4. The UE of claim 3, wherein the second service provider is associated with a second node of the distributed ledger network, and wherein the external device transmits an attestation of the external device container image to the second node of the distributed ledger network.

* * * * *